United States Patent [19]

Vrabel et al.

[11] 4,057,904

[45] Nov. 15, 1977

[54] SELF-ADJUSTING STRING EXTENSIOMETER

[75] Inventors: Joseph D. Vrabel, Concord; Dennis W. Gosselin, Saugus, both of Mass.

[73] Assignee: The United States of America as represented by the Secretary of the Department of Transportation, Washington, D.C.

[21] Appl. No.: 705,929

[22] Filed: July 16, 1976

Related U.S. Application Data

[63] Continuation of Ser. No. 590,814, June 27, 1975, abandoned.

[51] Int. Cl.² .................. G01B 3/10; H01C 10/00; G01B 7/02; G01D 1/00
[52] U.S. Cl. ................................ 33/125 R; 33/139; 33/140; 33/147 R; 338/68
[58] Field of Search ............... 33/137 R, 125 R, 139, 33/140, 1 M, 146, 147 N; 338/68

[56] References Cited

U.S. PATENT DOCUMENTS

| 3,685,358 | 8/1972 | Hubner et al. | 33/126.6 |
| 3,780,440 | 12/1973 | Taylor | 33/139 |
| 3,791,037 | 2/1974 | DiCiaccio et al. | 33/125 R |
| 3,832,781 | 9/1974 | Flagge | 33/1 M |

*Primary Examiner*—Steven L. Stephan
*Attorney, Agent, or Firm*—Herbert E. Farmer; Harold P. Deeley, Jr.

[57] ABSTRACT

Apparatus for use in the measurement of changes in the spacing between objects includes a rotatable wire storage reel coupled, by means of replaceable gears, to the drive shaft of a potentiometer. The apparatus is mounted on a first object and a wire on the storage reel is extended and attached to a second object spaced a variable distance from the first object. Constant tension is applied to the wire storage reel by means of a spring extending between a spring supply reel and a spring take-up reel coupled to the wire storage reel.

6 Claims, 3 Drawing Figures

SELF-ADJUSTING STRING EXTENSIOMETER

ORIGIN OF THE INVENTION

The invention described herein was made by employees of the U.S. Government and may be manufactured and used by or for the government for governmental purposes without payment of any royalties thereon or therefor.

CROSS-REFERENCE TO RELATED APPLICATION

This application is a continuation of application Ser. No. 590,814 filed June 27, 1975, now abandoned.

BACKGROUND OF THE INVENTION

1. Field of the Invention

The present invention relates to measurement of changes in length or distance. More specifically, this invention is directed to apparatus for providing an electrical signal commensurate with variations in spacing between objects and particularly to devices for sensing changes in the distance between moving objects. Accordingly, the general objects of the present invention are to provide novel and improved methods and apparatus of such character.

2. Description of the Prior Art

While not limited thereto in its utility, the present invention is particularly well suited for use in monitoring the spacing between moving objects such as, for example, railway cars. It is important for the engineer of a train, particularly a freight train, to know whether the couplings between cars of his train are compressed or extended. As is well known, in order to facilitate starting, the couplers between railway cars are designed to have a degree of slack. Thus, during motion the cars are free to move relative to one another and, unless appropriate measures such as braking or speed variation are taken by the engineer, accelerations and bumping can occur which may damage cargo.

In the prior art most devices capable of measuring changes in length or distance are suitable only for laboratory use such as, for example, in the testing of materials for deformation under strain. Such laboratory instruments are not suitable for use in the field because of their size and/or fragility. Additionally, such laboratory instruments can not be readily adjusted to work over differing ranges of measurement and generally are not suitable for the measuring of distance changes of comparatively large magnitude. As a further deficiency of the prior art laboratory-type instruments, the considerable expense of the apparatus weighs against its being left unattended; i.e., connected to telemetry transmitters and/or recording apparatus.

Comparatively inexpensive length or distance change measurement apparatus of the extensiometer or "string pull" type have been proposed. In such apparatus the unwinding of a string or wire causes the wiper arm of a potentiometer to be driven and the resultant resistance change is commensurate with changes in length or distance. The movements of the potentiometer wiper arm may thus be employed to generate an electrical output signal which can be monitored and/or recorded. Extensiometer devices of the "string pull" type are characterized by a number of serious operational problems. Thus, by way of example, under rapid distance changes the prior art extensiometer devices tend to bind as a result of the string escaping off the storage reel and jamming the mechanism. Such binding usually results in breaking of the string. Further, in order to achieve linearity over a wide operating range, the potentiometer employed must possess a high degree of uniformity of resistance. This requirement, in turn, dictates use of an extremely linear multi-turn potentiometer; such potentiometers comprising a single strand resistance wire helically wound on a bobbin. Potentiometers employing a single strand resistance wire, as is well known in the art, are prone to "jitter" failure resulting from the wiper arm wearing out a section of the resistance element along which it moves. Nevertheless, prior art "string pull" extensiometers have accepted the fragility incident to use of a single strand potentiometer in order to achieve accuracy and linearity over their design range of distance changes.

SUMMARY OF THE INVENTION

The present invention overcomes the above briefly discussed and other deficiencies and disadvantages of the prior art by providing a novel and improved "string pull" extensiometer. The distance measurement device of the present invention is characterized by the ability to provide accurate measurement while possessing the attributes of simplicity, reliability and moderate cost. Thus, an extensiometer in accordance with the present invention employs a single turn linear potentiometer rather than a multi-turn potentiometer as has characterized the prior art. The wiper arm of the potentiometer of an extensiometer in accordance with the present invention is coupled to a wire reel by means of gears and a slip clutch. The gear ratio may be easily varied to give different ratios of wire length change versus resistance change. A reverse wound flat spring extending from a spring supply reel applies a constant tension to the wire reel. The tension spring extends between the spring supply reel and a driven take-up reel connected to and coaxial with the wire reel.

BRIEF DESCRIPTION OF THE DRAWING

The present invention may be better understood and its numerous objects and advantages will become apparent to those skilled in the art by reference to the accompanying drawing wherein like reference numerals refer to like elements in the two figures and in which.

DESCRIPTION OF THE PREFERRED EMBODIMENT

Figure 3:
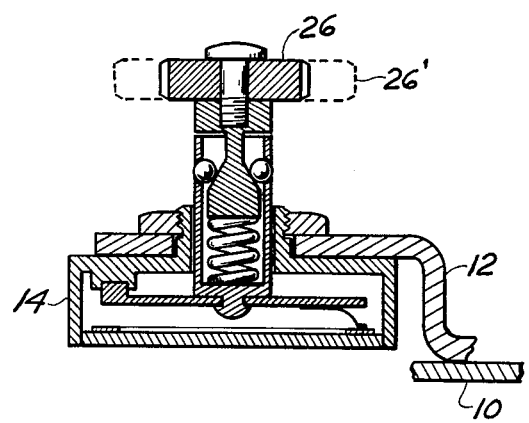
FIG. 3 is a cross-sectional side elevation view of the signal generator of the extensiometer of FIG. 1.

With reference now to the drawing, a "string pull" extensiometer in accordance with the present invention includes a housing, not shown, which receives a base or mounting plate 10. Plate 10 supports, by means of bracket 12, a single turn linear potentiometer assembly 14. The potentiometer assembly includes the variable resistance element, coupled to and driven by the potentiometer drive shaft, and a slip clutch. Potentiometer 14 may, for example, be a commercially available component such as Bourns Instrument Company part No. 3856Z-B79-253B. As may be seen from FIG. 3, the slip clutch comprises an "adjustment" shaft having a tapered section which fits into a recess in the potentiometer wiper arm drive shaft. A spring within the drive shaft biases the adjustment shaft against a plurality of balls which are held captive in the drive shaft. Pressure between the tapered adjustment shaft and the rotating balls in the drive shaft provides a clutch action. Rotational torque will move the potentiometer wiper arm until it reaches a positive stop and further applied torque will force the tapered adjustment shaft section to rotate the balls producing the slip or clutch action.

A tension spring supply reel 16, a tension spring take up reel 18 and a wire supply reel 20 are also rotatably mounted in any suitable manner on plate 10. The shafts about which reels 16, 18 and 20 rotate are parallel to the shaft of potentiometer 14. The wire supply reel 20 and the tension spring take up reel 18 are interconnected such that movements of the wire supply reel 20, resulting either from the wire 22 stored thereon being pulled off the reel or rewound on the reel under the influence of a tension spring, will be transmitted directly to the tension spring take up reel 18. Through the use of replaceable gears 24 and 26, respectively mounted for rotation with the wire supply reel 20 and the shaft of potentiometer 14, movements of the wire supply reel will be transmitted to the potentiometer drive shaft.

Figure 1:
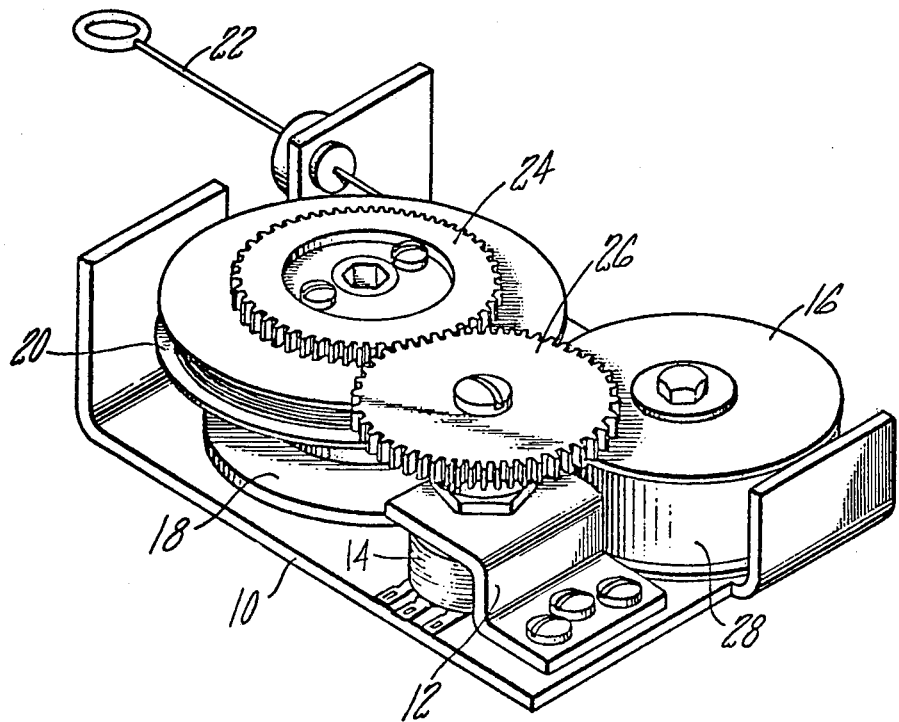
FIG. 1 is a perspective view of a first embodiment of an extensiometer in accordance with the present invention.
Figure 2:
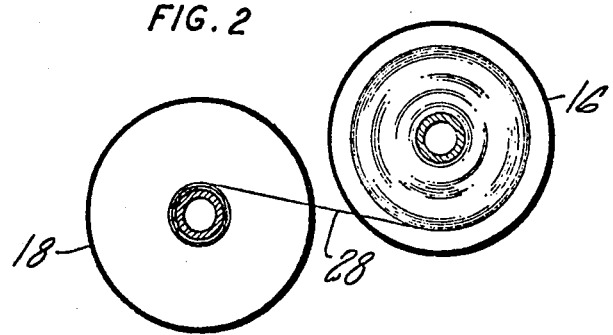
FIG. 2 is a schematic showing of the tension spring of the embodiment of FIG. 1.

Jointly considering FIGS. 1 and 2, a reverse wound flat spring 28 is used to develop a constant tension on the wire reel 20. Spring 28 is attached at its first end to supply reel 16 and coiled thereon with the spring tension. The second end of spring 28 is attached to a bobbin on the driven reel 18 and the spring is coiled on reel 18 against the spring tension. Thus, rotational torque is derived by winding the spring 28 on two separate bobbins; one coiled with the spring tension and one coiled against the tension. The total effect is a counterclockwise torque exerted on the driven take up reel 18 by the spring 28 trying to rewind itself onto the supply reel 16.

In operation, as the wire 22 is extended against the spring tension, the wire reel 20 rotates driving the potentiometer 14 through gears 24 and 26 and the slip clutch. As the wire unwinds the potentiometer resistance changes in a clockwise direction until the potentiometer limit is reached. When the limit is reached the clutch slips as wire 22 is further unwound and the clutch continues to slip until the desired extension of wire 22 is reached. Under this static condition the potentiometer remains in its furtherest clockwise position.

If the wire 22 is allowed to rewind back onto the wire supply reel 20 under the influence of spring 28, the potentiometer begins a counterclockwise rotation and resistance change which continues until the potentiometer reaches its counterclockwise stop. As the wire continues to rewind the clutch again slips and continues to slip until the desired minimum length of extended wire is reached. This static condition results in the potentiometer resting in its maximum counterclockwise position.

Thus, it may be seen that the present invention is a device characterized by a relatively small range of linear measurement which can be used at any extended length. If, for example, the length of wire motion causing movement of the potentiometer from full clockwise stop to full counterclockwise stop is represented by X, the extensiometer will accurately measure changes in length smaller than X of any total length L. The fact that the same resistance element varies over X at any total extended length L insures that a change in length of ½ X at total extended length L is equal to ½ X change at a total extended length of 2L, 3L or ½ L.

It is also significant to note that the value of X can easily be adjusted by varying the ratio of the potentiometer drive gears 24 and 26. Restated, as indicated schematically in FIG. 3 for gear 26 which may be changed to gear 26' with a simultaneous change also being made to gear 24, the gear ratio can be varied to give different ratios of wire length change versus resistance change. Additionally, where long operating life in an environment where the sensor is subjected to severe vibration is an important consideration, gears with fewer teeth and more play can be employed. This results in small inaccuracies when the wire reel 20 reverses direction but permits the drive to function as a "noise" filter to isolate the potentiometer from small rapid reversals; i.e., "jitter". Since "jitter" is the primary cause of potentiometer wear and thus component failure, deliberate incorporation of play in the potentiometer drive results in an increase in the life expectancy and reliability of the potentiometer; such enhanced reliability often being of more importance than the small inaccuracies which may be introduced.

An example of an environment where the extensiometer of the present invention has been found to be particularly useful, and prior art "string pull" extensiometers unsuitable, is in monitoring the relative positions of freight cars on a moving train. The desired information is whether two particular cars are in draft; i.e., a fully extended coupler state; buff; i.e., a fully compressed coupler state; or floating; i.e., neither fully extended nor fully compressed coupler state. The absolute distances between pairs of freight cars is a variable with intercar distances lying in the range of four to ten feet. Also, the amount of variation in distance from buff to draft is not constant and depends on the types of cars involved and the types of couplings used. Additionally, the amount of intercar variation between buff and draft on the same car pair is a variable depending on the force of the buff or draft condition and consequent compression of the coupling draft gear.

When used to monitor the relative position of a pair of freight cars, the extensiometer body; i.e., the plate 10 and the components mounted thereon installed in a suitable housing; is mounted to one car and the wire 22 is extended and attached to the opposing car. This sets the measurement distance and makes the extensiometer compatible with whatever coupling pair distance is involved. The previously mentioned "X" distance is set to the difference in coupling distance between draft and buff. This results in the potentiometer being in the full clockwise position with the cars in a draft condition and in a full counterclockwise position with the cars in the buff condition. This, of course, results in nonlinear mode of operation since changes in the car spacing difference greater than the set difference X will result in the clutch slipping with no potentiometer change. For linear operation the distance change may not exceed the set X distance. Of course, as described above, the ratio of gears 24 and 26 may be changed to give a larger range of linear operation.

As will be obvious, changes in the resistance of potentiometer 14 can be detected by simple electronics and recorded either adjacent the extensiometer or transmitted, via standard telemetry equipment, to a remote location and displayed and/or recorded. As will also be obvious to those skilled in the art, hysterisis points may be defined over the potentiometer range to eliminate "jitter" inherent in the measurement. Also, as noted above, proper choice of gear teeth size and spacing can help eliminate the mechanical "jitter".

To summarize the attributes of the present invention, the above-described novel extensiometer is compact, rugged, inexpensive and may readily be adjusted to various measurement ranges. The extensiometer of the present invention is characterized by elimination of the need for use of a potentiometer with a one to one mapping between measurable distance and resistance and also by elimination of resistance change fluctuations for distance changes at various extended lengths.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. Apparatus for measuring changes in distance proportionally small to an overall distance, said distance measuring apparatus automatically adjusting to the overall distance, said distance measuring apparatus comprising:

an extendable element;
rotatable drum means for storing said extendable element;
electrical signal generator means, said signal generator means including a pair of relatively movable members and providing an output signal which varies in accordance with the relative positioning of said movable members, said signal generator means further including fixed stops for determining the opposite limits of the relative movement between said members to thereby determine the signal generator means output signal excursion;
signal generator means drive means, said drive means including a rotatable shaft having a first end coupled to said signal generator means for causing relative movement between said members, said drive means further including a slip-clutch installed in said rotatable shaft whereby the second end of said shaft may rotate relative to said shaft first end when either limit of relative motion between said signal generator means relatively movable members is reached;
gear means, said gear means including a first gear mounted for rotation with said rotatable drum means and at least a second gear mounted for rotation with said second end of said signal generator means drive means rotatable shaft, said second gear being coupled to said first gear whereby movements of said drum means commensurate with unwinding or rewinding of said extendable element thereon will be transmitted to said signal generator means through said slip-clutch to cause relative motion between said signal generator means relatively movable members to thereby cause said signal generator means to provide an electrical output signal corresponding to the degree of extension or retraction of said extendable element; and
spring means for applying substantially constant tension to said drum means, said spring means comprising a spring applying rotational torque to said drum means to bias said extendable element in the direction of being rewound on said drum means.

2. The apparatus of claim 1 wherein said signal generator means comprises a single turn linear potentiometer.

3. The apparatus of claim 1 wherein said spring means comprises:

a spring supply reel;
a spring take-up reel, said spring take-up reel being coaxial with and coupled to said drum means for rotation with said drum means; and
a reverse wound spring, said spring being wound on said supply reel with the spring tension and being wound on said take-up reel against the spring tension.

4. The apparatus of claim 3 wherein said reverse wound spring comprises:

a flat ribbon-type spring.

5. The apparatus of claim 3 wherein said signal generator means comprises a single turn linear potentiometer.

6. The apparatus of claim 4 wherein said signal generator means comprises a single turn linear potentiometer.

* * * * *